US006242025B1

(12) United States Patent
Lesky et al.

(10) Patent No.: US 6,242,025 B1
(45) Date of Patent: Jun. 5, 2001

(54) METHOD AND APPARATUS FOR FOOD MARINATING

(76) Inventors: James Lesky; Teresa Lesky, both of 12 Clover La. South, Vernon, NJ (US) 07462; Joseph Lesky, 18 Connecticut St., Cranford, NJ (US) 07016

( * ) Notice: Subject to any disclaimer, the term of this patent is extended or adjusted under 35 U.S.C. 154(b) by 0 days.

(21) Appl. No.: 09/369,065

(22) Filed: Aug. 4, 1999

(51) Int. Cl.[7] ................................................. A23L 1/318
(52) U.S. Cl. ...................... 426/281; 426/231; 426/506; 99/468; 99/473; 99/487
(58) Field of Search ................................. 426/281, 506, 426/231; 99/486, 487, 468, 473

(56) References Cited

U.S. PATENT DOCUMENTS

| 194,550 | 8/1877 | Eckart . | |
|---|---|---|---|
| 474,446 | 5/1892 | Fey . | |
| 550,151 | 11/1895 | Averkamp . | |
| 1,052,862 | 2/1913 | Trescott . | |
| 3,928,634 | 12/1975 | Gasbarro . | |
| 4,012,808 | * 3/1977 | Strong | 426/281 |
| 4,265,766 | * 5/1981 | Crossley | 210/455 |
| 4,818,550 | 4/1989 | Davidson . | |
| 4,940,590 | * 7/1990 | Williams et al. | 426/92 |
| 5,057,332 | 10/1991 | Davidson . | |
| 6,014,926 | * 1/2000 | Tanaka et al. | 99/487 |
| 6,110,513 | * 8/2000 | Hackl et al. | 426/281 |

* cited by examiner

Primary Examiner—Nina Bhat
(74) Attorney, Agent, or Firm—Woodbridge&Associates, P.C.; Richard C. Woodbridge

(57) ABSTRACT

A method and apparatus provides infusing marinating liquids into foods in a relatively short period of time to enhance the flavor of said foods. The method uses air pressure above atmospheric to force marinating liquid into the foods. The foods are submerged in the marinade and the air pressure forces the marinade into the submerged foods. Air pressure and time of pressurization is electronically controlled and can be based upon the weight of the food to be marinated. The apparatus includes a sealed vessel for holding the food and marinate and electronic controls that set and manage a pump to control the pressure and duration of pressurization to insure adequate penetration of the marinating liquid into the food.

20 Claims, 5 Drawing Sheets

METHOD AND APPARATUS FOR FOOD MARINATING

FIELD OF THE INVENTION

This invention pertains to the field of food preparation. More specifically, a method and apparatus for quickly flavoring foods using marinating liquids is disclosed.

BACKGROUND OF THE INVENTION

It is common practice to marinate foodstuffs to enhance or change their flavor and to tenderize less expensive cuts of meats. Typically, meat or poultry is placed in a marinating liquid for an extended period of time so that the meat or poultry may absorb the marinating liquid and its flavor. Whereas marinating is a relatively simple process the time it takes for the foodstuff, such as meat, poultry, or vegetables to absorb sufficient quantities of marinating liquid is often a substantially long duration of time. Allowing meat, poultry and vegetables to remain in a marinade for as long as forty-eight hours prior to cooking is a common practice. As an example, Sauerbraten is typically prepared by placing beef bottom round roast, a relatively inexpensive meat, in a marinating liquid for up to 48 hours to flavor and tenderize the meat prior to its being ready for cooking. Very often time does not permit such thorough marinating and the quality and flavor is typically less than what it would have been with proper preparation.

Methods of marinating foodstuffs are well known in the art. U.S. Pat. Nos. 4,818,550 and 5,057,332 to Davidson, et al., and U.S. Pat. No. 3,928,634 to Gasbarro, disclose marinating meats and poultry by forming a vacuum (negative pressure differential) to suck the air out of the food that form spaces within the food into which the marinating liquid may enter and fill. Using vacuum techniques, for marinating of foodstuffs, however has disadvantages.

First, the greatest possible vacuum that can be achieved results in a pressure differential of one atmosphere—i.e., 14.7 pounds per square inch. To achieve this 14.7 psi pressure differential the vacuum and the vacuum seal must be perfect. As a perfect vacuum is unachievable, and defects in the vacuum seal decrease the ability to maintain the pressure differential, the actual difference in pressure may be significantly less than this greatest possible value.

Secondly, atmospheric pressure varies with altitude, and accordingly the greatest possible pressure differential that may be achieved also varies. For example, at sea level, the greatest possible pressure differential achievable is 14.7 psi, whereas, at an altitude of 5000 feet, the greatest possible difference in pressure differential may only be 12 psi; a 20% reduction in pressure.

Third, the level of absorption of the marinating liquid into the foodstuff is limited by the pressure differential achieved. As the marinating liquids begins to fill the spaces that are evacuated of air, the liquid filling the spaces in the outer food layer prevents entrapped air from escaping from the center layers of the food. The air thus remains trapped in the center of the food and either greater pressure differentials or longer periods of marinating are necessary to extract this trapped air and thoroughly marinate the foodstuff.

Other methods, using positive pressure to infuse liquids into foodstuffs, are known in the art. These methods, however, are more concerned with preservation of food rather than marinating to enhance flavor. U.S. Pat. No. 194,550 to Echart, U.S. Pat. No. 474,446 to Fey, U.S. Pat. No. 550,151 to Averkamp, and U.S. Pat. No. 1,052862 to Trescott disclose methods of using very high pressure over long periods of time to pickle meats and fish for preservation.

It would thus be highly desirable to reduce the time required to thoroughly marinate foodstuffs. The apparatus and method disclosed herein not only thoroughly marinates foodstuffs in a fraction of the time typically required for the marinating process, but also provides for greater penetration of the marinating liquid into the foodstuffs.

SUMMARY OF THE INVENTION

A method and apparatus are disclosed to infuse marinating liquids into foods in a short period of time to enhance or change their flavor, and, in some cases, to tenderize the food. The invention uses a positive pressure differential that causes the marinating liquids to be infused into the food while air trapped in the food is expelled by the entering liquid. Subjecting the foods to a positive pressure differential increases the penetration of the marinating liquid. Increasing either the pressure or the length of time that the positive pressure is applied increases the amount of marinating liquid that is forced into the food.

It is the principal object of the present invention to provide a method and apparatus for thoroughly marinating foodstuff in a short period of time.

This and other objects and advantages of the present invention will become apparent from the following detailed description taken in connection with the accompanying drawings.

BRIEF DESCRIPTION OF THE FIGURES

The advantages, nature and various additional features of the invention will appear more fully upon consideration of the illustrative embodiments to be described in detail in connection with the accompanying drawings. In the drawings.

It is to be understood that these drawings are for purposes of illustrating the concepts of the invention and are not to scale. It will be appreciated that the same reference numerals have been used throughout to identify corresponding parts.

DETAILED DESCRIPTION

Figure 1:
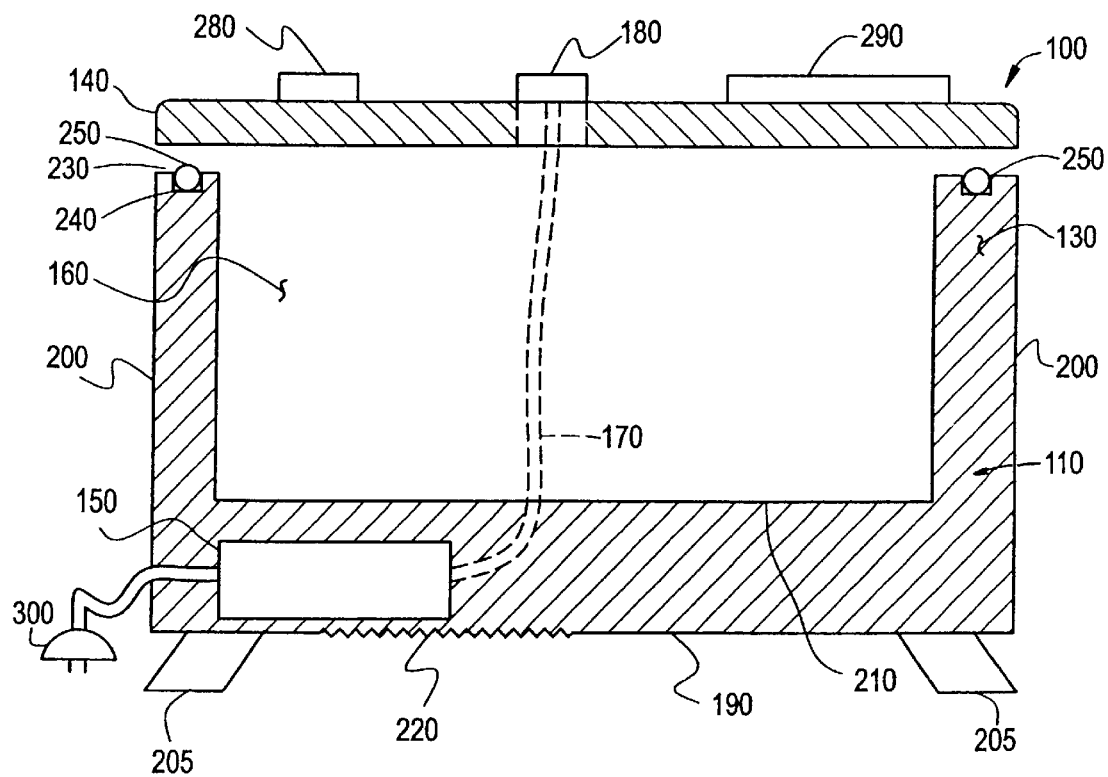
FIG. 1 illustrates a cutaway frontal view of an exemplary embodiment of the invention claimed.

Referring to FIG. 1, a marinating device 100 comprises a pressure vessel 110 defined by base unit 130 and cover 140. Pressure chamber 160 is formed when cover 140 is securely placed on base unit 130. A pump assembly 150, disposed in base unit 130, pressurizes chamber 160 by pumping air into chamber 160 through air tubing 170. Air tubing 170 is in fluid communication with control valve 180 to allow air to enter the chamber 160. Air control valve 180 when open allows air to enter chamber 160 and when closed seals the chamber to maintain the air pressure at the elevated levels. The elevated air pressure level forces marinating liquid into food placed within chamber 160.

Base unit 130 is defined by lower bottom wall 190, side walls 200 and upper bottom wall 210. Base unit 130 may be constructed in a square, rectangular, circular or elongated shape. The specific shape of base unit 130 is not material to the invention claimed and, as will be understood, the performance of the invention is not altered using any one shape over another. In the embodiment illustrated, between upper bottom wall 210 and lower bottom wall 190, an enclosure is formed for containing pump 150. Lower bottom wall 190 rests on feet 205 that raise bottom wall 190 slightly above the ground surface. Feet 205 provide for stability of base unit 130 on unleveled surfaces, help to dampen vibrations resulting from operation of pump 150 and allow a space to ventilate pump 150 through open grating 220 in lower bottom wall 190.

Side walls 200 extending upward from lower bottom wall 190 form a container with support surface 230 on the upper edge of side walls 200. In one embodiment of the invention, annularly disposed along the perimeter of support surface 230 is a generally "U" shaped recess 240 containing sealing ring 250. Typically sealing ring 250 is constructed as a silicon- or a rubber-based elastic material and is shaped as an O-ring or as a U-ring. Sealing ring 250 fills and closes any gap between cover 140 and base unit 130 at support surface 230 to prevent the escape of air during pressurization. A light coating of olive, vegetable, or corn, oil, may also be spread on sealing ring 250 to form a viscous boundary to enhance the air tight seal formed between cover 140 and base unit 130. In another embodiment of the invention, not illustrated, upper edge of side wall 200 is a smooth flat surface and sealing ring 250 is annularly disposed along the perimeter of cover 140. Sealing ring 250 fills and closes any gap that may occur between cover 140 and base unit 130.

Attached to side wall 200 are retaining clamps 260 that engage clasps 270 on cover 140. The engagement of retaining clamps 260 to clasps 270 securely hold cover 140 in place on base unit 130 and prevents cover 140 from lifting during the pressurization of pressure compartment 160.

In one embodiment of the invention, cover 140 may be completely removable from base unit 130 and is attached to base unit 130 through engagements clamps 260 and clasps 270 located on the opposing sides of base unit 130 and cover 140.

Figure 2:
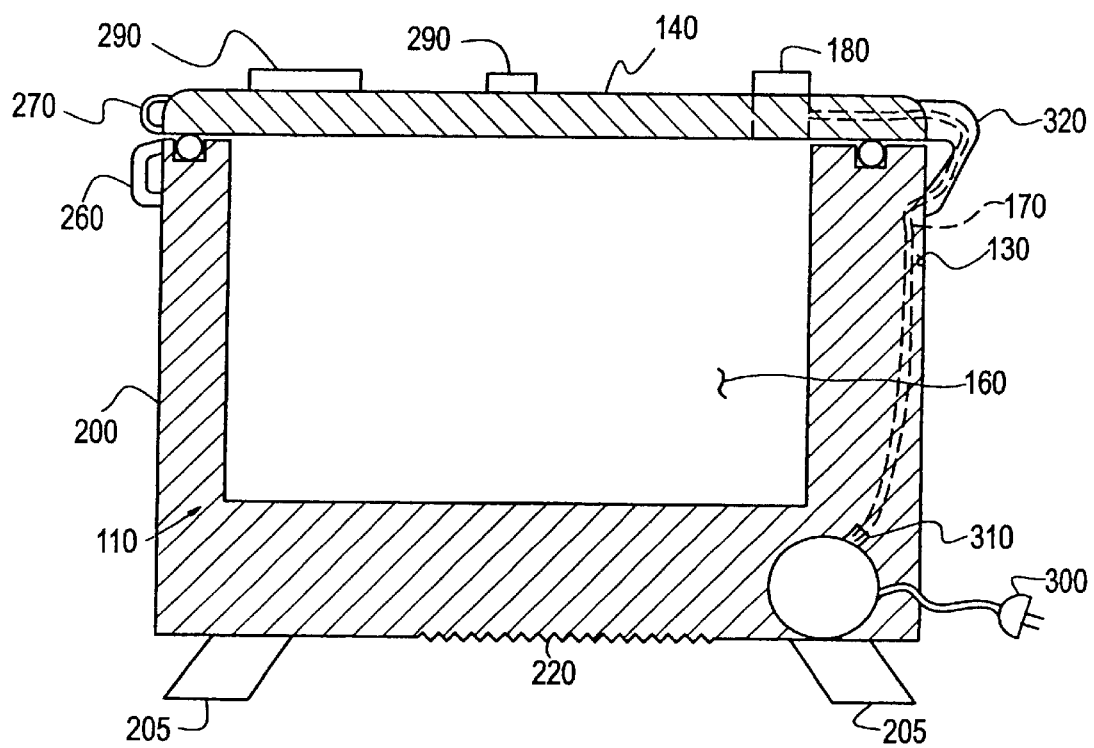
FIG. 2 illustrates a side view of the exemplary embodiment of the invention illustrated in FIG. 1.

Cover 140, in the exemplary embodiments illustrated in FIG. 1 and FIG. 2, is hinged to base unit 130 along side wall 200. In this embodiment, cover 140 has within it air pressure control valve 180, safety valve 280 and electronic controls 290. As will be understood control valve 180, safety valve 280 and electronic controls 290 may also be included within body 130 without altering the performance of the invention.

Control valve 180 controls the flow of air from pressure pump 150 into and out of chamber 160. Air pressure may also be expelled from chamber 160 through control valve 180. Safety valve 280 prevents pressure within chamber 160 from exceeding known pressure levels by releasing pressurized air from pressure chamber 160 to the surrounding environment when known pressure valves are reached. Pressure safety valves are well known in the art and details of such pressure valves are not disclosed herein. Electronic controls 290 control the operation of the invention by controlling the amount of pressure and the time duration for which the pressure remains in chamber 160. Electronic controls 290 include preset settings of pressure and time duration for specific foods. Further electronic controls 290 provide the user with the ability to adjust pressure and time independently for personal desires of flavoring or taste. Electronic controls 290 are in communication with pump 150 and control valve 180 to operate pump 150 and control valve 180. Electronic controls are well known in the art and details of such controls are not disclosed herein.

Further illustrated in FIG. 1, air pressure pump 150 is located internal to base unit 130, between lower bottom wall 190 and upper bottom wall 210. Typical alternating current (AC) electrical connector 300 extends through side wall 200 to allow for a connection to an electrical source to provide a power source to pressure pump 150 and electronic controls 290. Whereas an AC electrical source is illustrated in FIGS. 1 and 2, pressure pump 150 and electronic controls 290 may also be energized by a constant electrical source, for example, a battery or a rectified AC source (i.e., an AC adapter).

Pressure pump 150 includes an air egress opening that is in fluid communication with control valve 180, which in this illustrated embodiment is located in cover 140, through tubing 170. Tubing 170 preferably is a plastic tubing, however, any number of metal or resin tubing materials may be utilized without any loss of performance of the invention. FIG. 2, which illustrates a cut-away side view of the embodiment of the invention of FIG. 1, depicts a typical arrangement of the fluid connection between pressure pump 150 and control valve 180. In this exemplary embodiment, tubing 170 is enclosed within side wall 200 and cover 140 and passes through hinge 320 to connect tubing segments in side wall 200 and cover 140. In another embodiment of the invention, tubing 170 may be external to base unit 130 and covered by a material that is similar to, or different from, that of base unit 130. In another embodiment of the invention, tubing 170 may also be integrally incorporated into base unit 130 and cover 140 by including a channel within side wall 200 that continues through a similarly constructed channel in cover 140.

The method of the invention is now explained in regard to the operation of the apparatus of FIGS. 1 and 2. Electronic controls 290, when activated, causes control valve 180 to open and enables air to flow through tubing 170 into sealed chamber 160. Also started by electronic controls 290, pressure pump 150 pumps air into air tubing 170 which transports the air into chamber 160. Air continues to enter chamber 160 and without any means of escaping the air pressure within chamber 160 increases. Electronic controls 290 maintain control valve 180 open and pump 150 operational until the pressure within chamber 160 reaches a desired level of pressure, or for a fixed time for which a know and desired level of pressure may be achieved. The desired level of pressure as noted previously is set by the user based on level of marinating desired. The level of pressure, and duration, may be set automatically in electronic controls 290 through a single instruction, that sets known pressures and durations concurrently, or may be set individually in electronic controls 290 to meet particular levels of marinating. In one embodiment of the invention, the pressure and time duration may be set as a function of the weight of the food to be marinated. In this embodiment, electronic control means 290 communicate with a scale (not shown) that measures the weight of the foodstuffs placed in chamber 160.

After the desired pressure is attained, electronic controls 290 direct control valve 180 to close and pressure pump 150 to cease operation. The accumulated pressure in chamber 160 remains at the desired level for the duration of the desired time period during which time the marinating liquids are infused into the enclosed foods. In one embodiment of the invention, the desired level of pressure may be determined by computing the time necessary for pump 150 to supply sufficient amount of air to increase the pressure in chamber 160. This time may be incorporated into the programming of electronic controls 290. In another embodiment of the invention electronic controls 290 may also determine when the desired pressure is achieved by receiving feedback signals from pressure sensors (not shown) incorporated into chamber 160.

An advantage of using positive pressure in the marinating process is that sophisticated air sealing means are typically not necessary. In cases where the air seal is not perfect, losses in air pressure can be accommodated by the continued operation of pump 150. In this case, electronic controls 290 may intermittently restart pump 150 to increase air pressure to compensate for air losses through the seal.

At the conclusion of the desired time period, electronic controls 290 direct control valve 180 to open and the accumulated pressure in chamber 160 is released. In one embodiment of the invention, the air pressure may be released by passing the excess air through tubing 170 and pump 150 into grating 220. In another embodiment of the invention the air pressure may be released into the surrounding atmosphere through control valve 180 or a second port valve (not shown), which is also controlled by electronic controls 290. As there is no heat employed in the invention the release of pressurized air into the surrounding environment does not introduce a danger to the user, as, for example, the release of pressure from a pressure cooker.

After the air pressure in chamber 160 returns to a normal atmospheric pressure, cover 140 may be unclasped from base unit 130, the marinated foods removed, and prepared for cooking, if cooking is required. For example, raw vegetables may be marinated, to change their flavor or color, and then may be served without any further preparation.

Examples of the use of the invention are now presented to illustrate the advantages in marinating achieved through the method of the invention. Typical home marinating technique simply consists of preparing a marinating solution and submerging the foodstuff into the solution for some period time. The time period is not known precisely because different cuts of meat, or fish, or poultry or vegetable all have different rates of absorption. Generally, the longer the foodstuffs remain in the marinating solution, the more marinating flavor is absorbed. As an example, consider a 3 pound beef bottom round roast placed in a marinating solution for 48 hours increased in weight by approximately 4%. This increase in weight is expected as the marinating liquid is absorbed into the meat.

Using the method of the invention disclosed herein, a similar quantity of meat subjected to a pressure of 30 psig (pounds per square inch gauge) for 10 minutes experienced an increase in weight of 10%. In this case significantly more marinating solution (and flavor)was absorbed by the meat in significantly less time.

As can be understood, the method of the invention is not only applicable to meats but can be used for a large number of foods. Further, the method is not limited to the pressure or time durations expressed in the above exemplary examples, but can be varied over significant pressures and times. Examples of foods prepared in accordance with the method of the invention are presented in Tables 1 through 3.

Table 1 presents the percentage weight increase experienced by baked potatoes for different combinations of pressure and duration of pressurization.

TABLE 1

Percentage Increase in Weight of Baked Potato With Marinating

| | 1 Minute | 5 Minutes | 10 Minutes |
|---|---|---|---|
| 15 psig (approx. 2 atm.) | 0 | 0 | 17 |
| 20 psig | 13 | 24 | 44 |
| 30 psig (approx. 3 atm.) | 20 | 44 | 56 |

Table 2 presents the percentage weight increase experienced by pork chops for different combinations of pressure and duration of pressurization.

TABLE 2

Percentage Increase in Weight of Pork Chop with Marinating

| | 1 Minute | 5 Minute | 10 Minute |
|---|---|---|---|
| 15 psig (approx. 2 atm.) | 0 | 10 | 10 |
| 20 psig | 10 | 20 | 23 |
| 30 psig (approx. 3 atm) | 14 | 25 | 31 |

Table 3 presents the percentage weight increase experienced by zucchini for different combinations of pressure and duration of pressurization.

TABLE 3

Percentage Increase in Weight of Zucchini with Marinating

| | 1 Minute | 5 Minute | 10 Minute |
|---|---|---|---|
| 15 psig (approx. 2 atm.) | 00 | 30 | 38 |
| 20 psig | 15 | 36 | 42 |
| 30 psig (approx. 3 atm) | 22 | 49 | 56 |

Of course, it should be understood that Table 1–Table 3 only present exemplary values of pressure and time of pressurization and that a continuum of such values may be realized.

Figure 3:
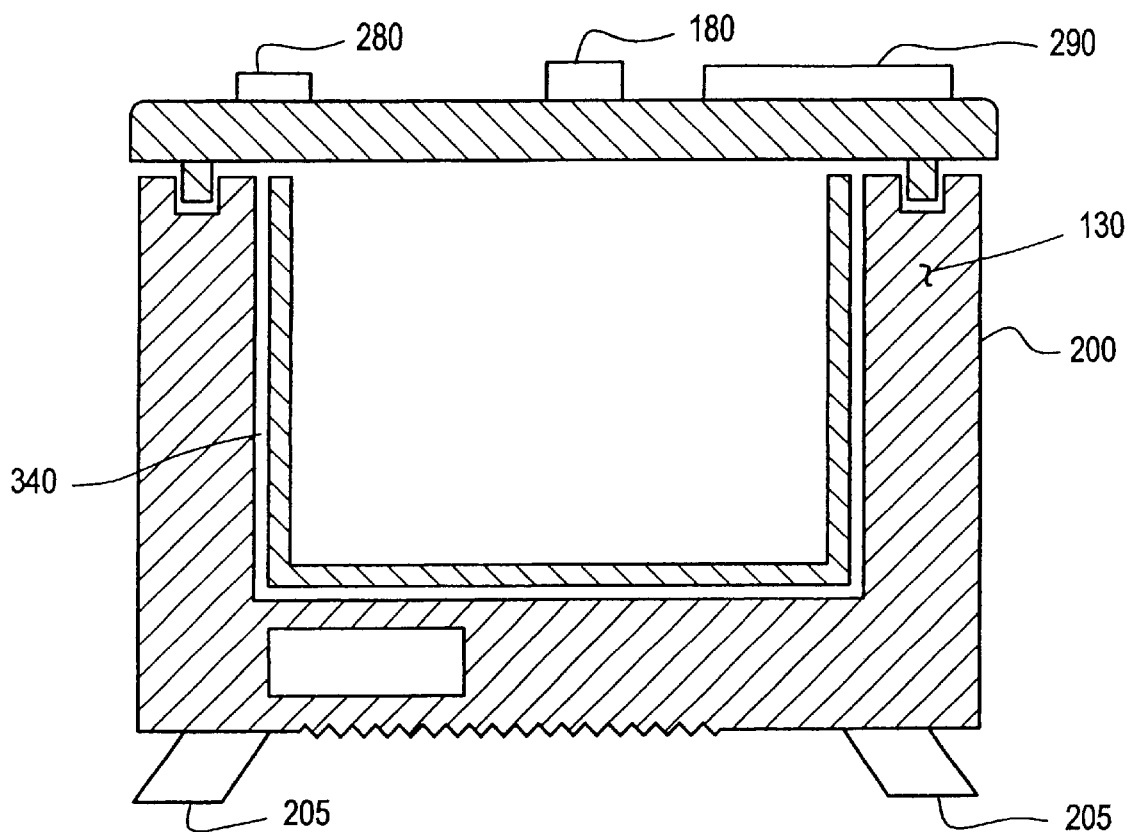
FIG. 3 illustrates a cutaway frontal view of a second exemplary embodiment of the invention claimed.
Figure 4:
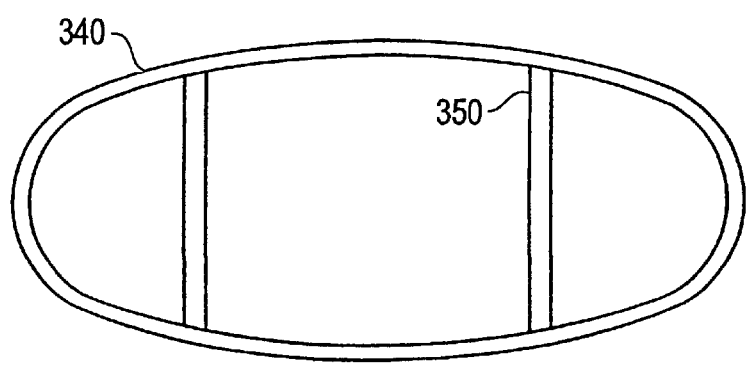
FIG. 4 illustrates a top view of an exemplary embodiment of a marinating container according to invention claimed.

In another embodiment of the invention, illustrated in FIG. 3, non-porous container 340 is sized to fit within chamber 160. Container 340 is used to hold the marinating liquid and foodstuff. In this embodiment only container 340 is in contact with foods and liquids. This provides for faster and simpler cleaning of the unit but otherwise does not alter the concept of the invention. Container 340 may also be divided into individual compartments, as illustrated in FIG. 4. It should be understood that this illustration is merely an exemplary example and container 340 may be of a square rectangular, circular, or elongated shape to accommodate the shape of chamber 160. In this embodiment, the individual compartments are isolated by non-porous material wall 350 from the other compartments within container 340. Container 340, sectioned in this manner, allows for different flavoring or marinating liquids and different foods to be placed in the different compartments to marinate a host of different foods with different flavorings at the same time. As is illustrated container 340 is divided into 3 compartments, however, it should be understood that this is for illustration only, and any number of compartments may be formed.

Figure 5:
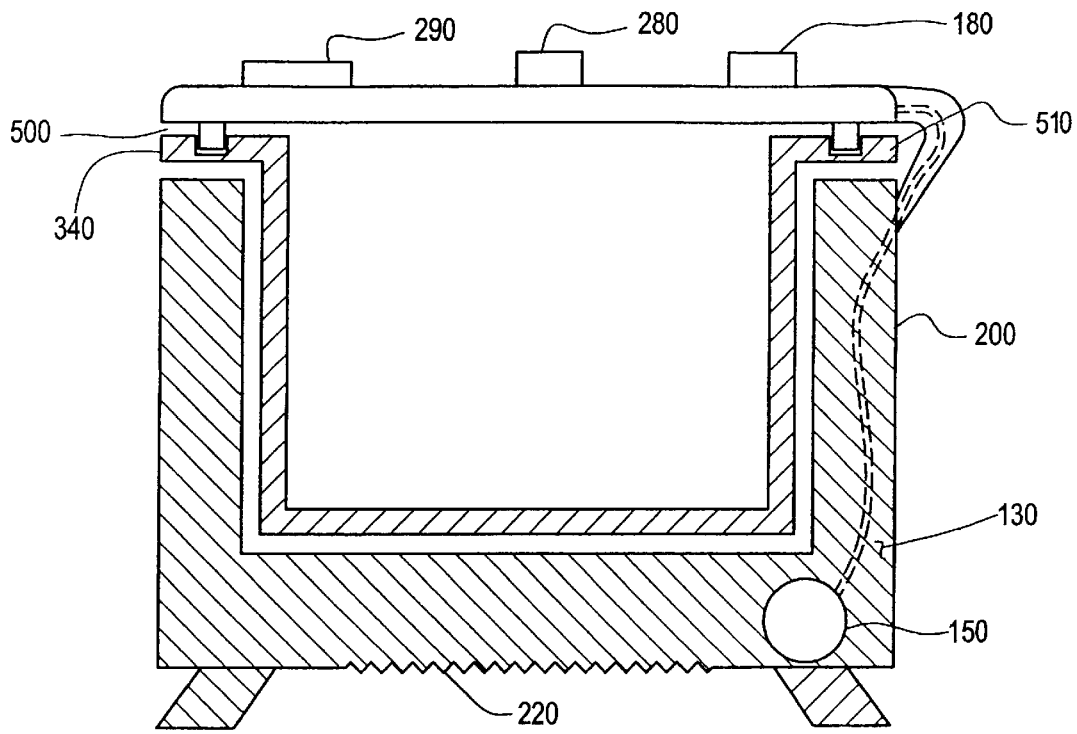
FIG. 5 illustrates a side view of a third exemplary embodiment in accordance with the invention claimed.
Figure 6:
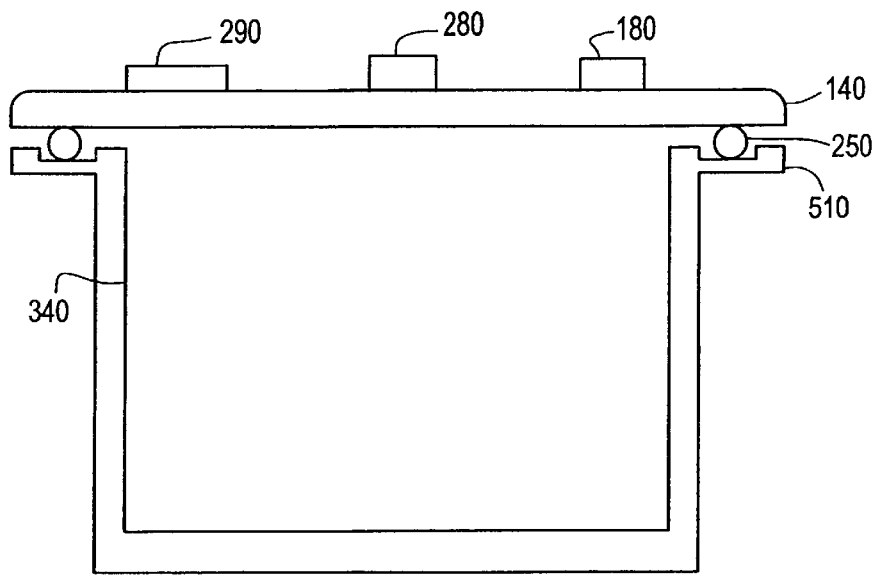
FIG. 6 illustrates a fourth exemplary embodiment of the invention claimed.

In another embodiment of the invention, container 340 may form an integral part of providing for pressurized chamber 160. In the exemplary embodiment illustrated in FIG. 5, supporting lip 500 of container 340 rests on support surface 230 of base unit 130. Annularly disposed within supporting lip 500 is a U-shaped groove 510 capable of engaging cover 140 such that the edges of cover 140 are contained within U-shaped groove 510. In still another embodiment, as illustrated in FIG. 6, U-shaped groove 510 may contain an O-shaped sealing ring 250 that engages cover 140 to form an air-tight seal. A light covering of oil, such as olive or vegetable or corn oil, may be spread on O-shaped sealing ring 250 and supporting lip 500 to form a viscous boundary to enhance the air tight seal of chamber 160 formed between cover 140 and base unit 130.

Figure 7:
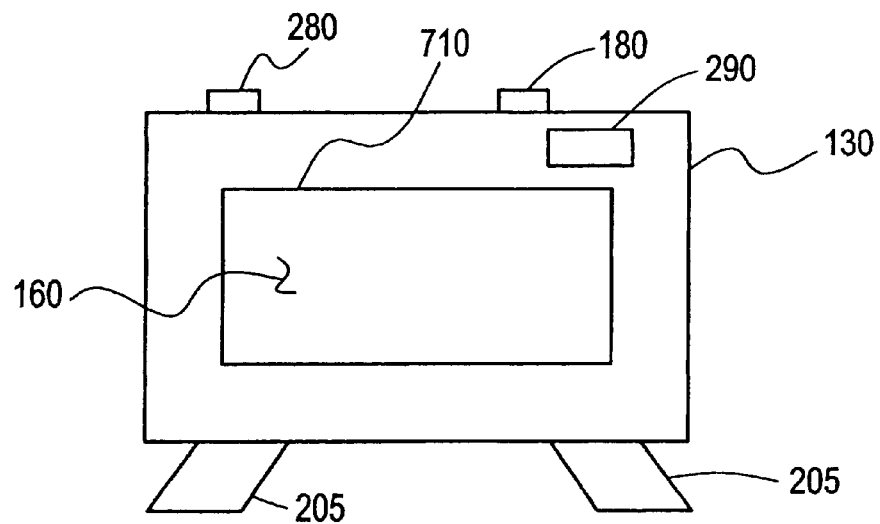
FIG. 7 illustrates a fifth exemplary embodiment of the invention claim.
Figure 8:
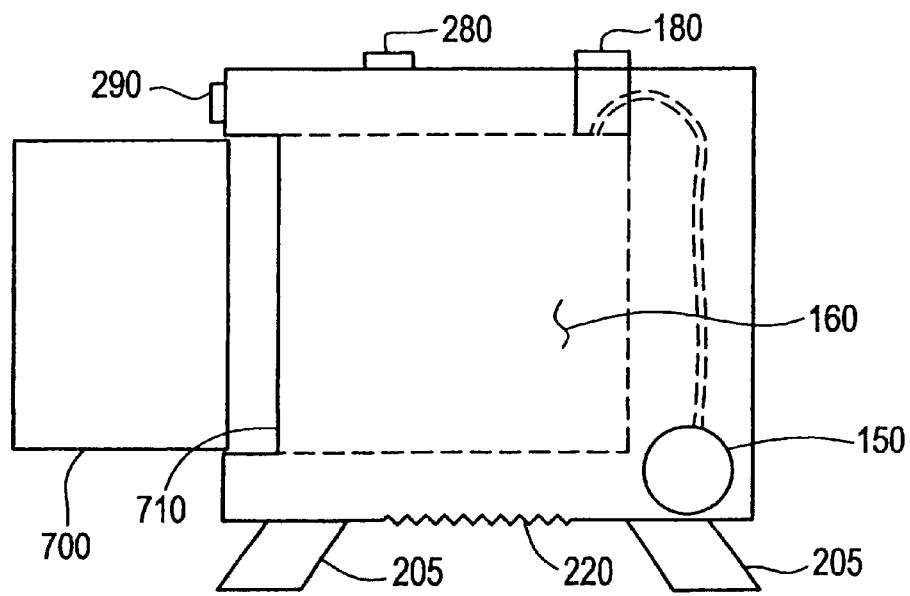
FIG. 8 illustrates a side view of the exemplary embodiment of the invention illustrated in FIG. 7.

In still another embodiment of the invention, as illustrated in FIG. 7, and similar in design to a microwave oven unit, air tight chamber 160 is created between base unit 130 and door 700. Sealing means, similar to those described in regard to FIGS. 1, 2, 5 and 6, within door 700 or opening 710 of base unit 130 are used to prevent pressurized air from escaping from chamber 160. In this embodiment, a container, similar to that illustrated in FIG. 4, is used to retain food and marinating liquid. The container may be a container of any shape and size and need not fit chamber 160 in a manner as container 340 fits chamber 160. In this embodiment, door 700 may be securely held to base unit 130 by clamps, as illustrated, or locking screws. Other mechanisms of securely retaining door 700 to base unit 130 are well known in the art and need not be enumerated herein. FIG. 8 depicts a side view of the invention depicted in FIG. 7 wherein pump 150 is illustrated deposed at the rear of base unit 130 and tubing 170 extends upward toward control valve 180. In this embodiment of the invention, control valve 180 is illustrated located on a side of chamber 160, however, control valve 180 may also be located on the top or back surface of chamber 160.

CONCLUSION

A novel method and apparatus of the marinating of foodstuffs have been presented that enable a user to quickly marinate a variety of foodstuffs to enhance or change their flavor, and to tenderize meats in particular. Employing positive pressure the ability to use greater pressure differentials aids in infusing marinating liquids more thoroughly and uniformly through out the food in a shorter period of time.

Numerous modifications and alternative embodiments of the claimed invention will be apparent to those skilled in the art in view of the foregoing description. The examples given herein are presented to enable those skilled in the art to more clearly understand and practice the invention claimed. The examples should not be considered as limitations upon the scope of the invention, but as merely representative of the use of the invention. Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention and the exclusive use of all modifications which come within the scope of the appended claims is reserved.

What is claimed is:

1. A method for marinating foods in a marinade to enhance the flavor of said foods to a predetermined desired level comprising the steps of:
   providing a container that may be pressurized to a pressure above atmospheric pressure;
   providing pump means to increase the pressure within said container above atmospheric pressure;
   providing electronic controls for said pump means to control the value of the pressure in said container and the time said pressure exists within said container.
   placing food and marinating flavoring solutions in said container;
   selectively raising the pressure above atmospheric pressure within said container to a predetermined value for a predetermined period of time by said electronic controls; to force said marinating flavoring solution into said food by said pressure to achieve the enhanced flavor of said food, to said desired level; and
   returning the pressure within said container to atmospheric pressure at the conclusion of said known period of time by said electronic controls.

2. The method as recited in claim 1 wherein said known pressure and known period of time are set from preset values in said electronic control means.

3. The method as recited in claim 1 wherein said known pressure and known period of time are set manually in said electronic control means.

4. The method as recited in claim 1 wherein said pressure and time are selected by said electronic control means according to the weight of food being marinated.

5. The method according to claim 1 wherein said pressure is held at 15 psig to 30 psig for at time of 1 to 10 minutes.

6. The method according to claim 5 wherein said pressure is held at 15 psig to 30 psig for a time of 5 to 10 minutes.

7. The method according to claim 1 wherein said food is a vegetable.

8. An apparatus for marinating foods in a marinade to enhance the flavor of said foods to a predetermined desired level comprising:
   a body having side and bottom walls defining a marinade and food cavity,
   a cover engaged with said side walls of said body wherein said body and said cover further define said cavity;
   sealing means for providing an airtight seal between said side walls of said body and said cover to hermetically enclose said cavity;
   at least one air control port having one end communicating with said cavity and a second end;
   pump means disposed within said body and in fluid communication with said second end of said air control port, said pump means provides air pressurized above atmospheric air pressure through said air control port to said cavity; and
   electronic control means for activating and deactivating said pump means and said air control port, to maintain a predetermine pressure within said cavity over a predetermined time period.

9. An apparatus as recited in claim 8, further comprising a non-porous food and marinade container located within said cavity of said body.

10. An apparatus as recited in claim 9, wherein said non-porous food and marinade container is divided into a plurality of individual chambers, each chamber being isolated from every other chamber.

11. An apparatus as recited in claim 8, wherein said electronic control means contains predetermined settings of pressure and duration of time.

12. An apparatus as recited in claim 11, wherein said electronic control means may be adjusted to change said pressure and said duration of time.

13. An apparatus as recited in claim 8, further comprising means for weighing said apparatus to determine the weight of said apparatus containing food and marinade and the difference between said two weights and to electronically transfer said difference in weight to said electronic controls.

14. An apparatus as recited in claim 13, wherein said pressure and duration of time are determined by said electronic control means after said difference in weight has been determined.

15. An apparatus as recited in claim 8, wherein said sealing means further comprises an elastic membrane angularly disposed between said cover and said body.

16. An apparatus as recited in claim 5, wherein each of said air control ports has a closed position blocking communication and an open position.

17. An apparatus as recited in claim 16, wherein each of said air control ports is independently switchable between said closed position and said open position.

18. An apparatus as recited in claim 17 wherein each of said air control ports is switchable by said electronic control means.

19. An apparatus as recited in claim 5, further comprising pressure measuring device means in communication with said cavity to determine the pressure in said cavity and with said electronic control means to activate and deactivate said pressure pump in response to pressure measurements in said cavity.

20. An apparatus as recited in claim 5 further comprising pressure safety valve means to release pressure in said chamber when a known threshold pressure value is exceeded.

* * * * *

UNITED STATES PATENT AND TRADEMARK OFFICE
CERTIFICATE OF CORRECTION

PATENT NO. : 6,242,025 B1  
DATED : June 5, 2001  
INVENTOR(S) : James Lesky, Teresa Lesky and Joseph Lesky It is certified that error appears in the above-identified patent and that said Letters Patent is hereby corrected as shown below:

<u>Column 9,</u>  
Line 10, change "claim 5 " to -- claim 8 --

<u>Column 10,</u>  
Line 4, change "claim 5" to -- claim 8 --  
Line 10, change "claim 5" to -- claim 8 --

Signed and Sealed this

Twenty-fifth Day of June, 2002

Attest:

JAMES E. ROGAN  
Attesting Officer     *Director of the United States Patent and Trademark Office*